UNITED STATES PATENT OFFICE.

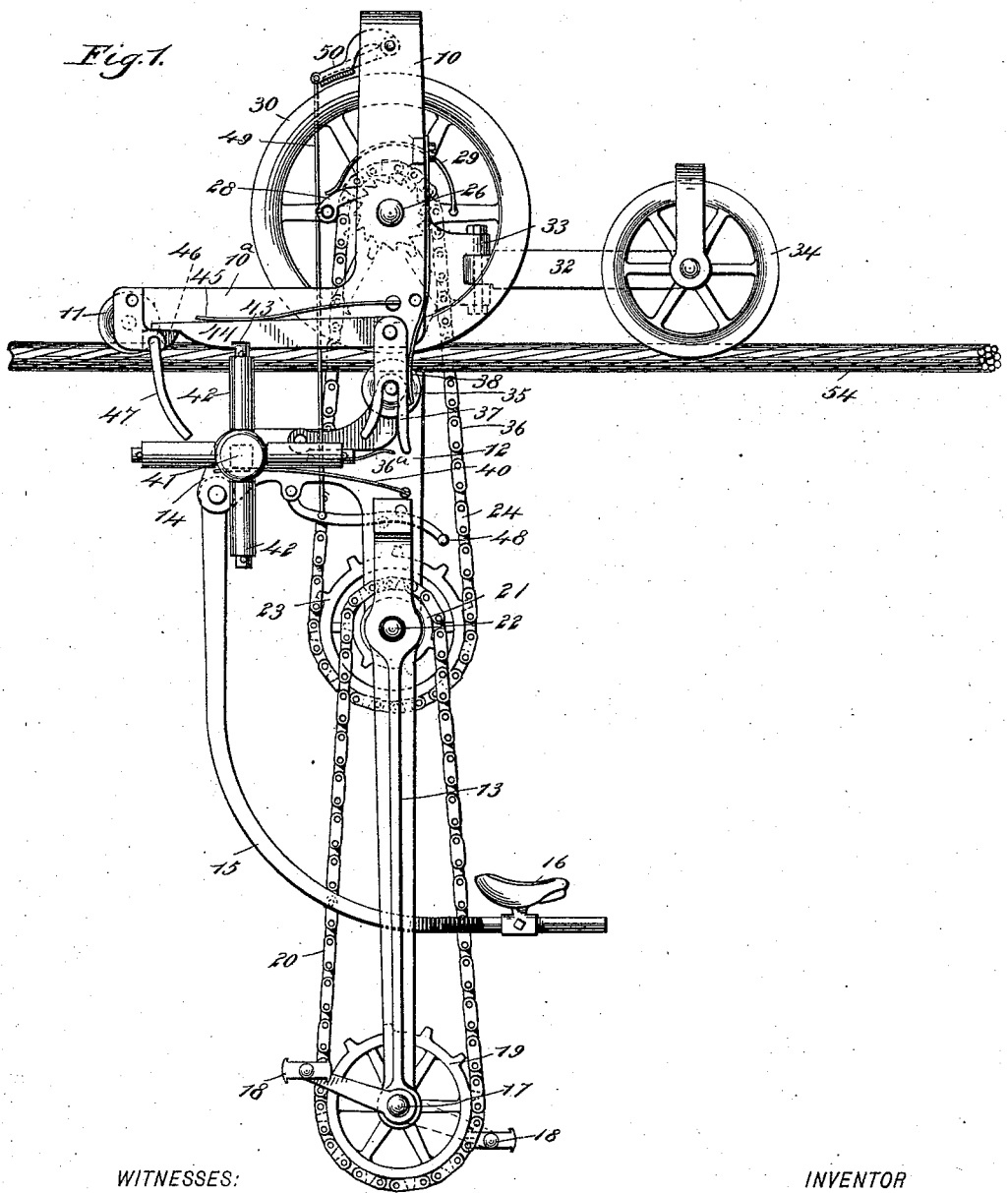

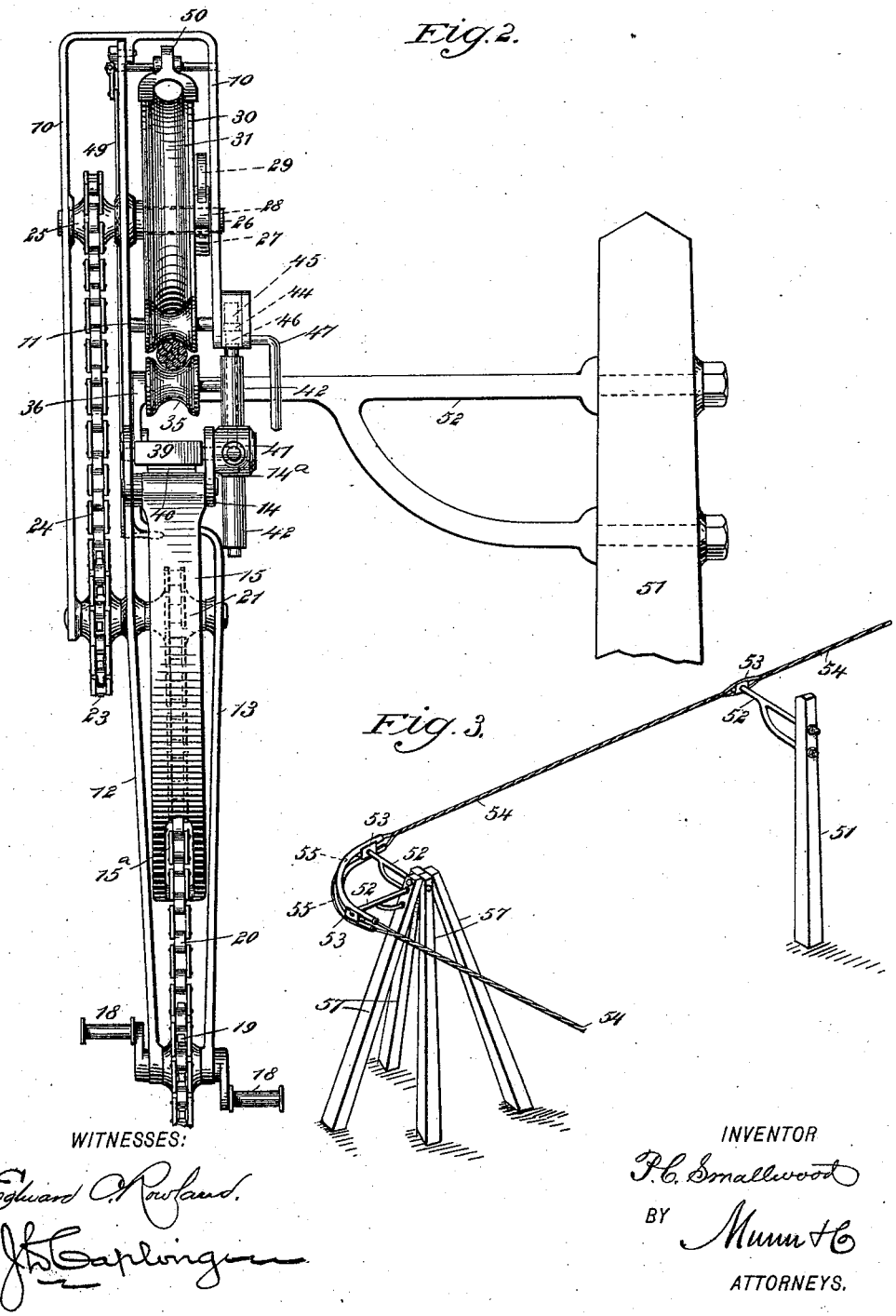

PRIER C. SMALLWOOD, OF LOUELLA, MISSOURI.

TROLLOCIPEDE.

SPECIFICATION forming part of Letters Patent No. 575,528, dated January 19, 1897.

Application filed April 16, 1895. Renewed July 20, 1896. Serial No. 599,910. (No model.)

*To all whom it may concern:*

Be it known that I, PRIER C. SMALLWOOD, of Louella, in the county of Ray and State of Missouri, have invented a new and Improved Trollocipede, of which the following is a full, clear, and exact description.

This invention relates to certain improvements in trollocipedes or trolley-cycles, such as are adapted to traverse a suspended track or cable; and the object of the invention is to provide a device of this character of a simple, inexpensive, and efficient nature which shall present certain features of novelty and advantages for use over other devices heretofore employed.

The invention also contemplates certain improvements in the tracks for supporting such vehicles, all as will be hereinafter fully set forth. The novel features of the invention will be carefully defined in the claims.

Reference is to be had to the accompanying drawings, forming a part of this specification, in which similar figures of reference indicate corresponding parts in all the views.

Figure 1 is a side elevation of the device embodying my improvements. Fig. 2 is an end view of the same; and Fig. 3 is a perspective view, drawn to a small scale and showing the construction of the track along which the vehicle is adapted to pass.

The trollocipede is provided with a U-shaped frame 10, having depending arms, one of which is provided with a forwardly-extending portion, in which is journaled a grooved roller or wheel 11, adapted to run on the upper face of the cable, the other arm of said frame 10 being of greater length and extending down below the first-mentioned arm, as indicated in Fig. 2.

To the upper part of the frame 10 is bolted or otherwise secured a vertical bearing-plate 12, extending downward between the arms of the frame 10, below the lower end of the hanger-arm thereof, and to said plate 12 is secured a similar plate 13, also extending vertically downward and alined with the said plate 12. The plate 12 is provided at its central part with a forwardly-extending arm 14, to which is pivoted a seat frame or bar 15, the lower end of which is curved and bent rearwardly and embraced between the plates 13 and 12 of the frame, and on the rear part of said bar 15 is mounted a saddle 16, as clearly seen in Fig. 1.

A crank-shaft 17 is journaled between the lower ends of the plates 12 and 13 of the frame and provided at its opposite ends with pedals 18, adapted to be operated by the rider seated on the saddle 16, and between the plates 12 and 13 a sprocket-wheel 19 is mounted, being secured to said shaft 17 and gearing with a chain belt 20, extending upwardly over a similar sprocket-wheel 21, fixed on a shaft 22, also journaled between the plates 12 and 13 of the frame, and one edge of said shaft 22 projects beyond the plate 12 and is journaled at its extremity in the lower end of the angle-arm or side of the U-shaped frame 10, as clearly seen in Fig. 2.

The projecting end of the shaft 22 is provided with a sprocket-wheel 23, of larger diameter than the wheel 21 and gearing with a second chain belt 24, extending upwardly over a sprocket-wheel 25, fixed on a shaft 26, journaled between the arms of the frame 10, as clearly seen in the drawings, and on said shaft 26 is loosely mounted a grooved roller or wheel 30, having a rubber or other elastic tire 31 adapted to roll on the supporting cable or track.

The shaft 26 is provided with a ratchet-wheel 27 fixed thereto, with which engages a pawl 28, secured to the wheel 30 or held in engagement with said ratchet-wheel normally by means of a leaf-spring 29, whereby when the shaft 26 is rotated in one direction said wheel 30 will be driven therefrom, and when said shaft is rotated in the opposite direction said wheel will be capable of free movement thereon.

At its upper part a link 32 is pivoted at 33 to the rear face of the vertical plate 12 of the frame, and in the extremity of said link is journaled a grooved wheel or roller 34, also adapted to travel on the supporting cable or track behind the wheel 30, said wheel 34 being capable of movement out of alinement with said wheel 30 to follow the curvature of the track or cable.

Below the wheel 30 is arranged a small grooved wheel or roller 35, adapted to press on the under side of the cable or track whereon the device runs, said wheel or roller 35 being journaled in the upper end of a curved supporting-bar 36, pivoted on the plate 12 and being normally held in engagement with the track or cable by means of a stout spring 36$^a$, and the journal or shaft of said roller or wheel 35 projects at one end and is adapted to engage between the bifurcations or parts formed at the lower end of a guide-bar 37, pivoted on the frame 10 and normally held in position, as seen in Fig. 1, by a spring 38, secured to said frame.

To the forwardly-projecting portion 14 of the plate 12 of the frame is secured a bearing-piece 14$^a$, and between the bearing-piece 14$^a$ and in the said plate and bearing-piece is journaled a shaft having a rectangular block 39, the side faces of which are adapted to be engaged by a spring 40, secured to the plate 12, as clearly seen in Fig. 1. The projecting end of said shaft is provided with a head 41, having arms 42 projecting therefrom at right angles to one another, and said arms are adapted to successively engage, as the shaft is rotated, a notch 43, formed in the lower end of the lever 44, pivoted to the frame 10 and extending forward parallel with the forwardly-extending arm 10$^a$ thereof, said lever being provided with a spring 45, adapted to press the same downward normally into position to be engaged by said arms 42 on said shaft. At its forward end the lever 44 is adapted to be supported on a cam-block 46, secured on a shaft journaled at the forward end of the arm 10$^a$ of the frame and provided with a depending crank-arm 47.

The trollocipede is provided with a brake-lever 48, pivoted to the frame and connected by a link 49 to a brake-shoe 50, pivoted at the upper end of the U-shaped portion of the frame and adapted to engage the opposite sides of the wheel 30, as clearly seen in Fig. 1, whereby, when desired, the device may be stopped when in motion.

As clearly seen in Fig. 2, the rubber tire 31 is of less width than the face of the wheel 30, and the brake-shoe 50 is U-shaped or forked, its bifurcations being arranged to engage the sides of the rim of the wheel 30, outside of the rubber tire thereon, whereby it will be understood the liability of the brake-shoe to pull off the tire, or wear or injure the same, is obviated.

The track employed for the device comprises a series of posts 51, provided with arms 52, each of which is provided at its outer end with a rectangular block 53, to the upper and lower faces of which are secured the strands of a wire cable or rope 54, as clearly seen in Fig. 3. At the bends in said track the posts 51 are replaced by a series of four posts 57, inclined to each other and provided with arms 52, having blocks 53, as above described, the strands of the cable at the upper and lower sides of said blocks being inclosed in protecting-housings 55, of metal or other suitable material, as clearly seen. At grades and other points where the wheels are liable to slip on the cable 54 I prefer to paint and sand said cable, so as to afford a firm hold for the wheels thereon.

In operation the crank-shaft 17 being rotated, imparts its movement to the shaft 26 through the medium of the chain-gearing between said shafts, and said shaft 26 imparts its movement to the wheel 30, whereby the device is driven along the cable 54. When the device is on a downgrade, the arrangement of the ratchet-and-pawl gearing between the shaft 26 and wheel 30 is such that said wheel 30 may rotate independently of said shaft, whereby the loss of power due to friction is reduced as much as possible.

When on the cable or trackway 54, the device is held against falling off therefrom on one side by the vertical plate 12 of the frame, and at its opposite side by the depending guide-bar 37, which engages the journal of the roller 35, and also by the arms 42 and the crank-arm 47, and in order that the device in its passage along the trackway or cable may pass the several supporting-arms 52 of the trackway or cable the said parts are made movable and adapted to be swung rearwardly on contact with said arms. As the device approaches one of the arms 52 the crank-arm 47 will first come in contact therewith, whereby the cam-block 46 is actuated to raise the lever 44 against the tension of its spring 45, so that the arm 42 on the head 41, which was before held in the notch 43 in said lever, is released, and said arm 42 and head 41 are permitted to turn when the supporting-arm 52 comes in contact with the former. The arm 52 having passed the arm 42 on the head 41, next engages the roller 35 and forces the same, together with its supporting-bar 36, downward, and at the same time said supporting-arm 52 engages the guide 37 and swings the same rearward on its pivot, such movement being permitted by the curvature of the bifurcations of the said guide. The guide 37 is swung rearwardly on its pivot-point far enough to permit the supporting-arm 52 to pass between the said guide and roller 35, after which the parts are returned to their original positions shown in the drawings by means of the springs 38 and 36$^a$.

It will be seen that the arm 42 on the head 41 is locked against movement by engagement with the notch 43 in lever 44 until said lever has been lifted by the engagement of the arm 52 on the post with the crank-arm 47 on the frame in advance of the arm 42, after which said arm 52 freely engages the arm 42 and turns the same together with the square block 39. Thus it will be seen that these devices constitute a movable latch for holding the device against removal from the track or cable, since either the crank-arm 47 or the guide-bar 37 will at all times extend across the space between the rollers 30 and 35 on the side thereof opposite to the plate 12.

Having thus described my invention, I claim as new and desire to secure by Letters Patent—

1. In a trolley-cycle, the combination of a frame, wheels journaled therein with their peripheries adapted to bear respectively, at the upper and lower sides of the track, said frame extending across the space between the wheels at one side, whereby the device is held against removal from the track in one direction, and a movable latch device mounted on said frame and extending across the space between the wheels at the side opposite the frame, substantially as set forth.

2. In a trolley-cycle or the like, the combination of a frame, wheels journaled therein with their peripheries adapted to bear above and below the track, one of said wheels being movable toward and from the other to overcome inequalities in the track and having a projecting journal, said frame extending across the space between the wheels at one side, whereby the device is prevented from removal in one direction, and a guide-bar pivoted on the frame and extending across the space between the wheels at the side opposite the frame, said bar having a forked end adapted to receive and guide the said journal, substantially as set forth.

3. In a trolley-cycle or the like, the combination of a frame, wheels journaled therein with their peripheries adapted to bear above and below the track, one of said wheels being movable toward and from the other to overcome inequalities in the track, said frame extending across the space between the wheels at one side thereof, whereby the device is prevented from removal from the track in one direction, and a latch device comprising two independently-movable parts mounted on the frame and extending across the space between the wheels at the side opposite the frame, substantially as set forth.

4. In a trolley-cycle or the like, the combination of a frame, two wheels journaled therein and adapted to bear on the track at top and bottom, one wheel being movable toward and from the other, said frame extending across the space between the wheels at one side, a shaft journaled in the frame, a block on the shaft having flattened sides, a spring adapted to bear on the sides of the block, arms on said shaft extending across the space between the wheels at the side opposite the frame, a notched lever pivoted to the frame with its notch adapted to engage and hold one of the arms on said shaft, a crank-shaft, a cam thereon in engagement with said lever and adapted to move the same to disengage the arm from the notch therein, and a crank-arm on said shaft extending across the space between said wheels, substantially as set forth.

5. In a trolley-track, the combination with a support having an arm provided with a block at its end, of a cable composed of strands, said cable having its strands separated and secured to opposite sides of said block, substantially as set forth.

6. In a trolley-track, the combination of supports having arms, each having a block at its extremity, a cable composed of strands, said cable having its strands separated at said blocks, and housings secured to opposite sides of said blocks and extending between the same, said housings being connected to the respective strands of the cable, substantially as set forth.

PRIER C. SMALLWOOD.

Witnesses:
 DANIEL SEVERNS,
 D. A. JONES.